United States Patent [19]
Granqvist et al.

[11] Patent Number: 4,852,346
[45] Date of Patent: Aug. 1, 1989

[54] POWER PLANT WITH CYCLONE CLEANERS HAVING COOLED CYCLONE LEGS

[75] Inventors: Evert Granqvist; Alf Wike, both of Västerås, Sweden

[73] Assignee: ABB Stal AB, Västerås, Sweden

[21] Appl. No.: 179,360

[22] Filed: Apr. 8, 1988

[30] Foreign Application Priority Data

Apr. 9, 1987 [SE] Sweden ................................ 8701486

[51] Int. Cl.⁴ .............................................. F02C 3/26
[52] U.S. Cl. ................................. 60/39.464; 110/266
[58] Field of Search ................... 60/39.464; 110/216, 110/263, 266; 431/170

[56] References Cited

U.S. PATENT DOCUMENTS

| | | | |
|---|---|---|---|
| 4,281,510 | 8/1981 | Borjesgard et al. | 60/39.464 |
| 4,546,709 | 10/1985 | Astrom | 60/39.464 |
| 4,734,030 | 3/1988 | Fenaux | 110/216 |

FOREIGN PATENT DOCUMENTS

| | | | |
|---|---|---|---|
| 3108413 | 9/1982 | Fed. Rep. of Germany | 60/39.464 |
| 2370584 | 11/1976 | France | |
| 383266 | 3/1976 | Sweden | |
| 435098 | 10/1984 | Sweden | |

*Primary Examiner*—Louis J. Casaregola
*Attorney, Agent, or Firm*—Pollock, Vande Sande & Priddy

[57] ABSTRACT

A cyclone used for high temperature cleaning of combustion gases from a PFBC power plant is formed with an elongated leg surrounded by a jacket forming a cooling channel around the leg. Compressed combustion air cools the cyclone leg to a temperature at which the material from which it is made has a satisfactory strength and resistance to wear. Air for additional cooling of ash separated in the cyclone can be supplied at a downstream orifice of the cyclone leg.

16 Claims, 2 Drawing Sheets

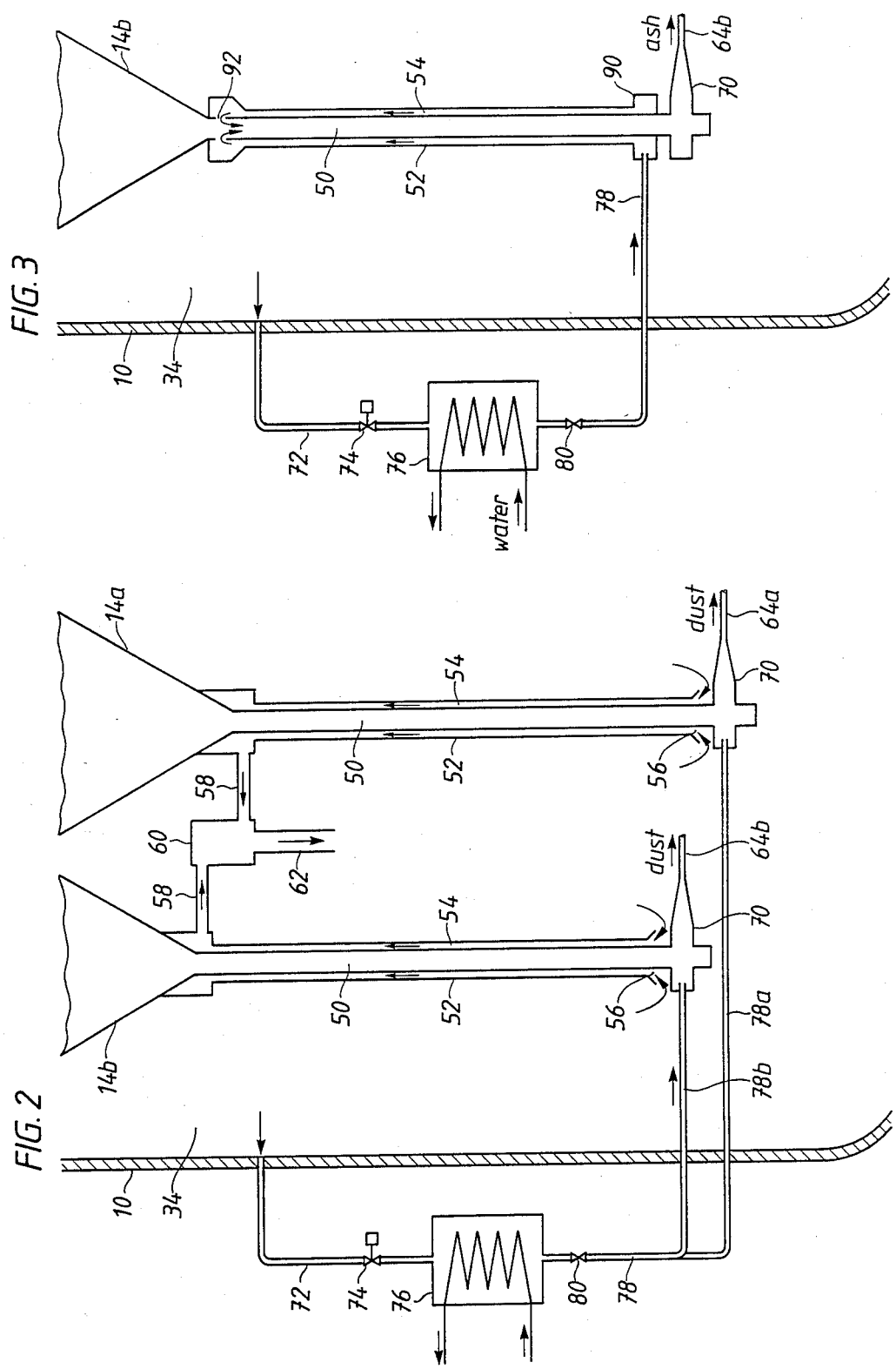

4,852,346

POWER PLANT WITH CYCLONE CLEANERS HAVING COOLED CYCLONE LEGS

BACKGROUND OF THE INVENTION

The invention relates to a power plant in which fuel is burnt in a fluidized bed of particulate material at a pressure considerably exceeding atmospheric pressure and with utilization of the combustion gases for operation of a gas turbine. The invention has utility for a Pressurized Fluidized Bed Combustion "PFBC" power plant with a bed vessel and with cyclones forming gas cleaning equipment enclosed within a pressure vessel and surrounded by compressed combustion air.

DISCUSSION OF PRIOR ART

The combustion gases from the fluidized bed of a PFBC are utilized for the operation of gas turbines and the highest possible gas temperature at the turbine inlet is aimed at. This means that the gas cleaning equipment used to separate dust from the combustion gases, is thermally insulated so that the heat losses are limited. The gas cleaning equipment therefore operates substantially at the temperature of the combustion gases when these leave the bed. The working temperature may be about 950° C., i.e. the highest temperature which can normally be accepted for combustion in a fluidized bed in view of the risk of slag formation disturbing the operation. A temperature of this magnitude puts considerable stress on a cyclone used for cleaning the combustion gases before they are supplied to a turbine and on the system used for discharging separated dust. Such a high temperature reduces the resistance to abrasion of the material used to construct the cyclone and results in rapid wear of the gas cleaning equipment. The combination of a high operating temperature, erosive dust and a high velocity of dust-laden gas involves considerable problems when choosing constructional materials for the cleaning equipment and when designing the cleaning and discharge equipment. The problems are especially great in the lowermost part of each cyclone, at the outlet for separated dust, where the dust/gas mass will have the highest speed of rotation because of the reduced diameter in the cyclone at that location. Thus a greatly increased rate of abrasion will occur on the hot wall of the cyclone near to the dust outlet. Likewise, a high intake temperature involves problems from the points of view of material choice and design which are difficult to master in a pneumatic, pressure-reducing dust discharge device.

By a suitable design of the outlet part of a cyclone, it has proved to be possible in accordance with this invention to attain a satisfactory working life for the cyclone by using relatively simple and not too expensive construction materials currently available on the market. It has also proved to be possible to reduce, in a simple manner, the temperature at the inlet of a pressure-reducing dust discharge system so that also the cost of such a system can be reduced.

SUMMARY OF THE INVENTION

According to the invention, a cyclone of a gas cleaning plant in a PFBC power plant is provided with a cyclone leg surrounded by a jacket which, together with the cyclone leg, forms a channel which extends along the cyclone leg and which conducts a coolant along the cyclone leg so that its wall temperature is maintained at a level which does not compromise its strength and resistance to wear. Combustion air, which is preheated, is suitably used as the coolant. It is also possible to cool the cyclone leg with water and feed water which is to be fed to heating tubes in the fluidized bed can be used and will be preheated thereby.

The wall temperature in the cyclone leg should desirably be lower than 600° C. at the outlet from the cyclone. By making the cyclone leg with a larger diameter, for example 150 mm or more, than is usual in normally existing cyclones, the gas/dust velocity is limited and the erosion rate reduced. The length of the cyclone leg desirably exceeds 1500 mm. The maximum possible length is limited by the space in the pressure vessel of the plant, which vessel surrounds the combustion chamber. Besides a lower speed of rotation of the gas/dust mass, a larger diameter also provides an increased cooling surface and hence improved cooling, lower wall temperature and improved resistance to abrasion. It also means that the downwardly-flowing gas/dust mass is effectively cooled in the cyclone leg. A desirable reduction of the temperature to about 500° C., or lower, is possible. Temperatures below 500° C. also reduce the risk of ignition of carbonized residue in the dust and the risk of combustion taking place with a resultant temperature increase in the ash discharge system. The lower temperature of separated dust and transport gas means that simpler materials than would otherwise be usable can be used to construct a pressure reducing pneumatic ash discharge system.

Compressed combustion air direct from a compressor of the PFBC plant or the pressure vessel can be used as the cooling gas for cooling each cyclone leg. In one embodiment of the invention, this cooling air is subsequently led to the air distributor of the bed vessel and is utilized for the combustion. The ash can be cooled further by introducing cooling air into the ash discharge system at the outlet from the cyclone leg, suitably in a mixing chamber forming a lower part of the cyclone leg. Air which is taken direct from a compressor of the plant or direct from the pressure vessel can be used. Alternatively, the air can be cooled in an air cooler to a low temperature, for example in an air cooler using water as the coolant. The air quantity is desirably controlled such that the main part of the transport gas for the ash consists of this supplied air. As an alternative, the cooling gas may consist of compressed, cooled combustion gas with a low oxygen content.

In another embodiment of the invention, openings are provided in an upper part of the cyclone leg where the cooling gas from the channel around the cyclone leg can flow into the cyclone leg. In this embodiment, the gas quantity is desirably controlled in such a way that the amount of gas supplied will constitute the main part of the transport gas for discharging the ash. Also in this embodiment, compressed combustion air is suitably used, which can be cooled in a separate air cooler to a low temperature. As an alternative, oxygen-poor combustion gas, compressed in a special compressor, can also be used.

The lower part of the cyclone, the outlet part, can be made cylindrical with a cyclone leg, projecting into this part, with a pressure reducing inlet nozzle. Such a cyclone is disclosed in Brännström et al's U.S. Pat. application Ser. No. 107,303 filed on the Oct. 13, 1987 and can be used in this invention,

BRIEF DESCRIPTION OF THE DRAWINGS

Embodiments of the invention will now be described in greater detail, by way of example, with reference to the accompanying drawings, wherein FIG. 2 shows, on an enlarged scale, the arrangement of cooling means for the cyclone legs used in the plant of FIG. 1, and FIG. 3 shows a second embodiment of cooling means.

DESCRIPTION OF THE PREFERRED EMBODIMENTS

Figure 1:
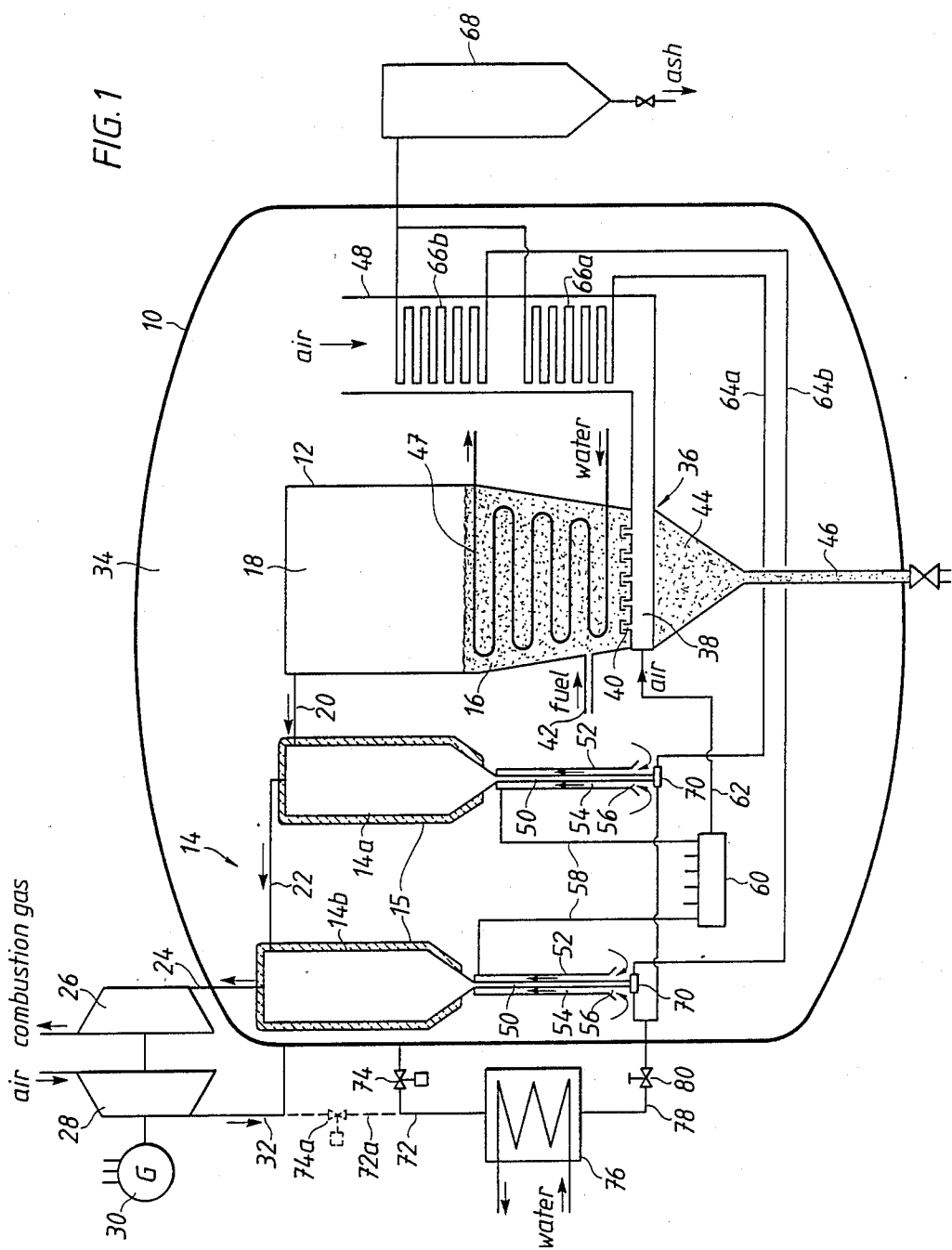
FIG. 1 shows a schematic view of a PFBC power plant.

In the drawings, 10 designates a pressure vessel of a PFBC power plant, in which are arranged a bed vessel 12 and a cleaning plant 14 for the combustion gases generated during combustion of a fuel in a fluidized bed 16 provided in the bed vessel 12. The combustion gases collect in a freeboard 18 of the vessel 12 and are passed, via a conduit 20, to a primary cleaning cyclone 14a and further, via a conduit 22 to a series-connected secondary cyclone 14b. Several groups of series-connected cyclones would normally be provided but for convenience only two are shown in the drawings.

The cyclones 14a and 14b are provided with thermal insulation 15 which reduces the cooling of the combustion gases when these pass through the cleaning plant 14. The cleaned gas is led, via a conduit 24, to a turbine 26 which drives a compressor 28 and a generator 30. Combustion air, compressed in the compressor 28, is led, via a conduit 32, to the space 34 between the pressure vessel 10, the bed vessel 12, the cyclones 14a, 14b and other equipment enclosed within the pressure vessel.

The bed vessel 12 is provided with an air distributor 36 which comprises a number of parallel chambers 38 each provided on their upper side with nozzles 40 for the supply of air to the bed vessel 12 for fluidizing material in the bed 16 and combustion of fuel supplied to the bed through a fuel feed pipe 42. Consumed bed material is able to pass between the chambers 38 to a below-bed space 44 and is removed therefrom through a valved discharge tube 46. Tubes 47 are arranged in the bed vessel 12 for generating steam to be fed to a steam turbine (not shown) and for cooling the bed 16. The chambers 38 of the air distributor 36 are supplied with combustion air from the space 34 via a duct 48.

The cyclones 14a and 14b are each formed with long cyclone legs 50 of a relatively large cross-sectional diameter. The diameter preferably exceeds 150 mm and the length preferably exceeds 1500 mm. Each cyclone leg 50 is surrounded by a cooling jacket 52. The leg 50 and the jacket 52 of each cyclone form an annular cooling air channel 54. Each cooling air channel 54, in the embodiment according to FIGS. 1 and 2, communicates directly with the space 34 by an opening 56 at the lower end of the channel 54, i.e. at the upstream end. The downstream end of each channel 54 is connected via a conduit 58, to a common header 60 for a plurality of groups of cyclones. The header 60 communicates with the chambers 38 of the air distributor 36 via a conduit 62.

Particulate material (e.g. ash) separated out from the combustion gases in the cyclones 14a, 14b is transported via conduits 64a and 64b, respectively, and pressure reducing discharge devices 66a and 66b, respectively, to a collecting container 68. The pressure reducing discharge devices 66a and 66b are formed as ash coolers and are located in the duct 48 and are cooled by the combustion air, which is thus heated. The discharge devices may be of the kind disclosed in European Pat. No. 0 108 505.

In the embodiment shown in FIG. 1, each cyclone leg 50 opens out into a chamber 70, which is supplied with transport and cooling air from the space 34 in the pressure vessel 10. The ash is additionally cooled in this way so that the risk of unburnt carbon catching fire and burning the ash discharge system is reduced. This transport gas and cooling air can either be taken directly from the space 34 in the pressure vessel 10, or drawn in via a conduit 72 provided with a control valve 74, a cooler 76 and a conduit 78 with a cut-off valve 80. Transport and cooling air can alternatively be taken directly from the compressor conduit 32, as indicated by the dash-lined conduit 72a with the valve 74a.

In the embodiment according to FIG. 3, the annular cooling channel 54 is connected to a chamber 90 surrounding a lower part of the cyclone leg 50 and the channel 54 is supplied with cooling air from the space 34 either directly via an opening in the wall of the chamber 90 or, as shown in FIG. 3, via the conduit 78. The conduit 78 may be connected directly to the space 34 in the pressure vessel 10 or via a cooler 76 and a conduit 72.

Via one or more openings 92 at the upper end of a conduit leg 50, cooling air from the channel 54 can flow into the cyclone leg 50 and cool the descending ash and unburnt fuel. The air flow through such openings 92 can be controlled such that it forms the main part of the transport gas for the removal of separated material through the ash discharge system.

FIG. 2 shows the cooling channel 54 on each leg 50 extending up to surround the lowermost or outlet end of the cyclone 14a or 14b. Each leg 50 can have a cross-sectional diameter which exceeds 200 mm and a length which exceeds 3000 mm.

The invention is not to be considered as being limited to the illustrated embodiments since numerous changes can be made thereto within the scope of the following claims.

What is claimed is:

1. A power plant in which fuel is burnt in a fluidized bed of particulate material at a pressure exceeding atmospheric pressure comprising a pressure vessel, a bed vessel inside the pressure vessel, means to feed fuel to be burnt to the bed vessel, an air distributor with nozzles locted within the bed vessel, means to feed pressurized air to the air distributor to create a fluidized bed in which the fuel is burnt, at least one cyclone within the pressure vessel, means for leading combustion gases from the bed vessel to the at least one cyclone, a pressure reducing ash discharge system for the removal of separated ash from the at least one cyclone, a turbine which is driven by combustion gases cleaned in the at least one cyclone outside said bed vessel but inside said pressure vessel, and a compressor for the compression of combustion air supplied to the pressure vessel in which said cyclone at its lower end is connected to an elongated downwardly extending tubular leg communicating with said ash discharge system, a cooling jacket surrounding said cyclone leg to form a channel for a cooling medium around the leg and within the jacket, an inlet at one end of said channel communicating with the space in said pressure vessel containing pressurized combustion air and an outlet for said cooling medium at the other end of said channel.

2. A power plant as claimed in claim 1, in which the inlet to said cooling channel is situated at the lower end of the cyclone leg, whereby the cooling air flows in opposite direction to the ash flow.

3. A power plant according to claim 2, wherein the cooling channel has an upstream end and a downstream end and at its upstream end is open towards the space between the pressure vessel and the bed vessel and at its downstream end is connected to the air distributor of the bed vessel.

4. A power plant according to claim 1, wherein the leg of the at least one cyclone opens out into a mixing chamber which is supplied with cooling gas.

5. A power plant according to claim 2, wherein the leg of the at least one cyclone opens out into a mixing chamber which is supplied with cooling gas.

6. A power plant according to claim 5, wherein the mixing chamber is supplied with air from the space in the pressure vessel.

7. A power plant according to claim 5, further including an air cooler and wherein the mixing chamber is connected to the pressure vessel via the air cooler.

8. A power plant according to claim 5, further including an air cooler and wherein the mixing chamber is connected to the compressor via the air cooler.

9. A power plant according to claim 1, in which the cooling channel has an upstream end and a downstream end wherein the upstream end of the cooling channel is connected to the space between the pressure vessel and the bed vessel and in which at the downstream end of the cooling channel there is provided openings in the cyclone leg for the passage of cooling air from the cooling channel to the cyclone leg.

10. A power plant according to claim 1, in which an air cooler is provided, wherein the cooling channel has an upstream end and a downstream end and the upstream end is connected to the pressure vessel via the air cooler.

11. A power plant according to claim 1, in which an air cooler is provided, wherein the cooling channel has an upstream end and a downstream end and the upstream end is connected to the compressor via the air cooler.

12. A power plant according to claim 1, wherein the leg of the at least one cyclone has an inner diameter exceeding 150 mm.

13. A power plant according to claim 1, wherein the leg of the at least one cyclone has an inner diameter exceeding 200 mm.

14. A power plant according to claim 1, wherein the leg of the at least one cyclone has a length exceeding 1500 mm.

15. A power plant according to claim 1, wherein the leg of the at least one cyclone has a length exceeding 3000 mm.

16. A power plant according to claim 1, wherein the outlet end of the at least one cyclone is surrounded by said cooling jacket.

* * * * *